(12) United States Patent
Santan et al.

(10) Patent No.: US 11,163,605 B1
(45) Date of Patent: Nov. 2, 2021

(54) HETEROGENEOUS EXECUTION PIPELINE ACROSS DIFFERENT PROCESSOR ARCHITECTURES AND FPGA FABRIC

(71) Applicant: XILINX, INC., San Jose, CA (US)

(72) Inventors: Sonal Santan, San Jose, CA (US); Min Ma, San Jose, CA (US); Soren Soe, San Jose, CA (US); Cheng Zhen, Santa Clara, CA (US); Lizhi Hou, Dublin, CA (US); Yu Liu, Newark, CA (US)

(73) Assignee: XILINX, INC., San Jose, CA (US)

( * ) Notice: Subject to any disclaimer, the term of this patent is extended or adjusted under 35 U.S.C. 154(b) by 136 days.

(21) Appl. No.: 16/571,776

(22) Filed: Sep. 16, 2019

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC ................................................ G06F 9/4881
See application file for complete search history.

(56) References Cited

U.S. PATENT DOCUMENTS

| | | | |
|---|---|---|---|
| 7,467,175 B2 | 12/2008 | Simkins et al. | |
| 9,218,443 B1 * | 12/2015 | Styles | G06F 30/327 |
| 9,519,486 B1 | 12/2016 | Blott et al. | |
| 9,836,568 B1 | 12/2017 | Ganusov et al. | |
| 2014/0282570 A1 * | 9/2014 | Prasanna | G06F 9/4881 |
| | | | 718/102 |

* cited by examiner

*Primary Examiner* — Wissam Rashid
(74) *Attorney, Agent, or Firm* — Patterson + Sheridan, LLP

(57) ABSTRACT

Examples herein describe techniques for launching and executing a pipeline formed by heterogeneous processing units. A system on a chip (SoC) can include different hardware elements which form a collection of heterogeneous processing units, such as general purpose processor, programmable logic array, and specialized processors. These processing units are heterogeneous meaning their underlying hardware and techniques for processing data are different, in contrast to a system that using homogeneous processing units. In the embodiments herein, the heterogeneous processing units can be arranged into a pipeline where each stage of the pipeline is performed by one of the processing units.

18 Claims, 10 Drawing Sheets

US 11,163,605 B1

HETEROGENEOUS EXECUTION PIPELINE ACROSS DIFFERENT PROCESSOR ARCHITECTURES AND FPGA FABRIC

TECHNICAL FIELD

Examples of the present disclosure generally relate to implementing a pipeline that relies on heterogeneous processing units to form a plurality of stages.

BACKGROUND

A system on a chip (SoC) can include a mix of programmable logic (e.g., programmable fabric) and software-configurable hardened logic such as processing cores or engines which form heterogeneous processing units. SoCs have become popular and attractive for accelerating various workloads. The heterogeneous processing units in the SoC can be used to build hybrid acceleration engines where the SoC (e.g., a peripheral component interconnect express (PCIe) acceleration device) is plugged into PCIe host that includes x86 or PowerPC® processors. The heterogeneous processing units in the SoC make it possible to run compute workloads where various stages of processing are spread across host processors and the various heterogeneous processing units in the SoC.

SUMMARY

Techniques for implementing a pipeline using heterogeneous processing units are described. One example is a heterogeneous system that includes a plurality of heterogeneous processing units where the heterogeneous processing units are assigned to execute a plurality of stages forming the pipeline. The heterogeneous system also includes a command queue configured to receive commands issued by a host and a scheduler configured to instruct a first stage of the plurality of stages to execute a first task corresponding to a first command, inform the host when the first command is complete, instruct a second stage of the plurality of stages to execute a second task corresponding to a second command, and inform the host when the second command is complete.

Another embodiment described herein is a method that includes transmitting, from a host, multiple commands to perform at a plurality of stages forming a pipeline implemented in a heterogeneous system where the heterogeneous system comprises a plurality a heterogeneous processing units assigned to execute the plurality of stages. The method also includes instructing, at the heterogeneous system, the plurality of stages to execute tasks corresponding to the multiple commands and informing the host each time one of the commands completes.

Another embodiment described herein is a computing system that includes a SoC that includes a plurality of heterogeneous processing units where the heterogeneous processing units are assigned to execute a plurality of stages forming a pipeline and a scheduler. The computing system also includes a host that includes a user application configured to submit commands to be executed by the plurality of stages. The scheduler is configured to instruct the plurality of stages to execute the commands, each of the commands corresponds to only one of the plurality of stages and informs the host each time one of the commands completes.

DETAILED DESCRIPTION

Figure 1:
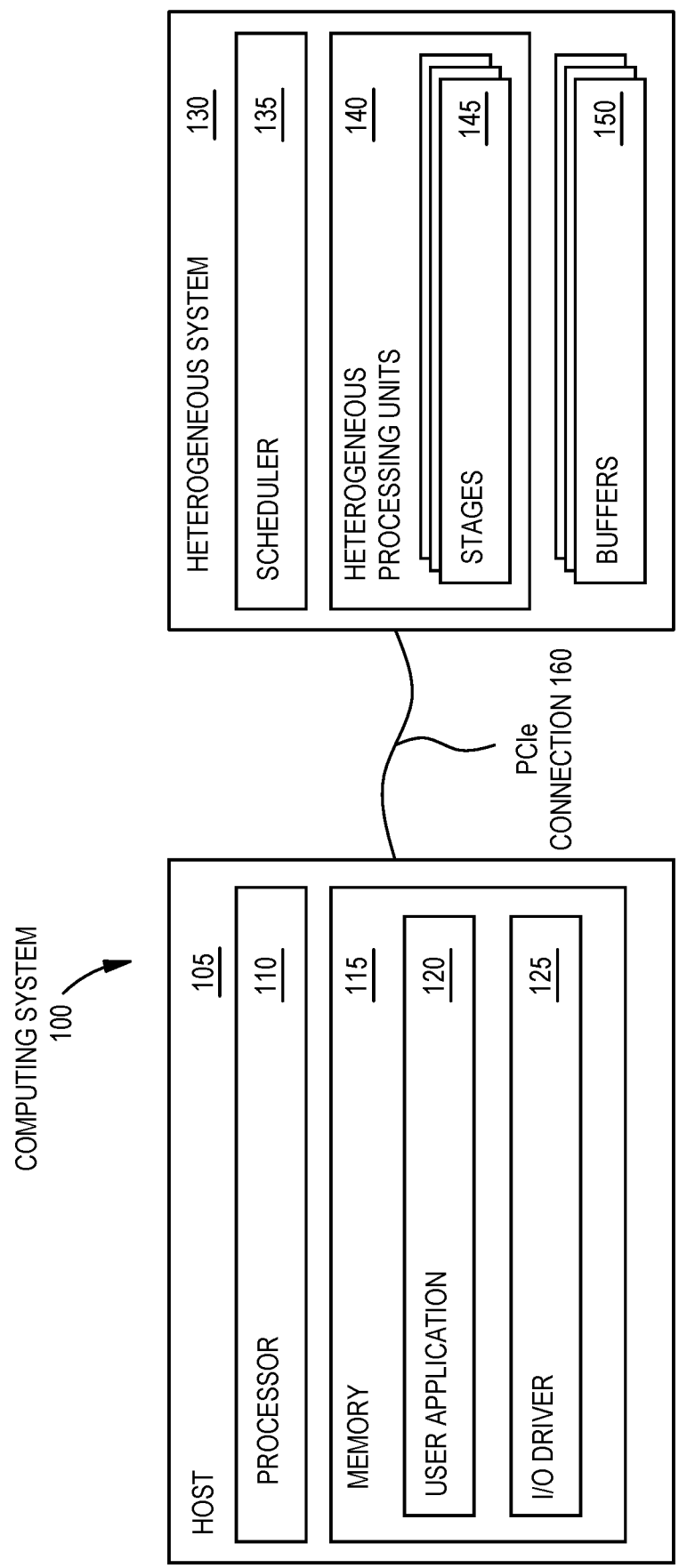
FIG. 1 is a block diagram of a computing system with a host coupled to a heterogeneous system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for launching and executing a pipeline formed by heterogeneous processing units. A SoC can include different hardware elements which form a collection of heterogeneous processing units. For example, the SoC can include a general purpose processor (also referred to as a processing subsystem (PS)), a programmable logic array which can be configured into one or more compute units, and specialized processors. These processing units are heterogeneous, meaning their underlying hardware and techniques for processing data are different, in contrast to a system that has homogeneous processing units (e.g., a server which has multiple x86 processors). For example, the PS may use a reduced instruction set computer (RISC) architecture to process data while the programmable logic array using programmable logic circuits to perform specific tasks.

The heterogeneous processing units in a SoC may be well suited for different accelerator tasks (e.g., machine learning, cryptography, graphics, compression, etc.) where the different tasks are assigned to different ones of the processing units. In the embodiments herein, the heterogeneous processing units can be arranged into a pipeline where each stage of the pipeline is performed by one of the processing units. Further, the pipeline can include the processors in the host.

Launching and scheduling the stages in the pipeline is difficult given the differences between the heterogeneous processing units in the host and the SoC. To launch (i.e., configure) the pipeline, the host may use different compilers for each of the different processing units. The resulting compiled code can then combined into a binary that is transmitted to a scheduler in the SoC that configures the heterogeneous processing units to perform their respective tasks. To execute the pipeline, the host sends a command to the SoC for executing a particular stage in the pipeline. After receiving the command, the scheduler ensures that any dependency has been resolved, and if so, forwards the command to the processing unit assigned to perform that stage of the pipeline. When the stage is complete, the scheduler can inform the host and determine whether there is another command ready to be dispatched. In this manner, the host and SoC can work together to execute a pipeline implemented on heterogeneous processing units.

FIG. 1 is a block diagram of a computing system 100 with a host 105 coupled to a heterogeneous system 130, according to an example. The host 105 includes a processor 110 and memory 115. The processor 110 can represent any number of processing elements that have any number of processing cores. The processor 110 can use any type of instruction set architecture (ISA). In one embodiment, if the host 105 includes multiple processors 110, these processors may use the same ISA—i.e., are homogeneous.

The memory 115 can include volatile memory elements, non-volatile memory elements, and a combination thereof. The memory 115 includes a user application 120 (e.g., a software application) which submits tasks to be performed by a pipeline formed by stages 145 in the heterogeneous system 130. Moreover, the pipeline can also include stages performed by the processors 110 in the host 105. In one embodiment, the user application 120 is a graphics application, machine learning application, cryptographic application, and the like which relies on the heterogeneous system 130 to perform accelerator tasks more efficiently than if those tasks were performed solely using the processor 110 on the host 105.

The memory 115 also includes an input/output (I/O) driver 125 that communicates with the heterogeneous system 130. For example, the heterogeneous system 130 may be an I/O device or an accelerator device. Using a PCIe connection 160, the I/O driver 125 can transmit data, commands, and other information to the heterogeneous system 130. The I/O driver 125 also receives data transmitted from the heterogeneous system 130 intended for the host 105. Thus, the I/O driver 125 provides a communication interface between the host 105 and the heterogeneous system 130.

The heterogeneous system 130 may be a SoC, a collection of integrated circuits (ICs) mounted on a common substrate (e.g., a printed circuit board), or a single IC. The heterogeneous system 130 may be mounted inside the host 105 or in a separate enclosure (e.g., an expansion box).

The system 130 includes a scheduler 135, heterogeneous processing units 140, and buffers 150. The scheduler 135 can be hardware, software, firmware, or a combination thereof that launches and executes a pipeline formed by the stages 145. In one embodiment, the scheduler 135 configures the heterogeneous processing units 140 to perform the stages 145. The techniques used to launch and execute tasks using the stages 145 are described in more detail below.

The buffers 150 provide storages for the stages 145. In one embodiment, the buffers are arranged in the pipeline between each of the stages. A first stage 145 can store processed data in the buffer which is then retrieved by the next stage 145 in the pipeline. The buffers 150 can be shared by two different processing elements (i.e., heterogeneous processing elements). Sharing of buffers 150 across a heterogeneous system where each processing element may have a different view/address of the same buffer is unique.

In one embodiment, a buffer 150 can be shared between a PCIe host like x86 and an AArch64 processor in a PCIe end point.

Figure 2:
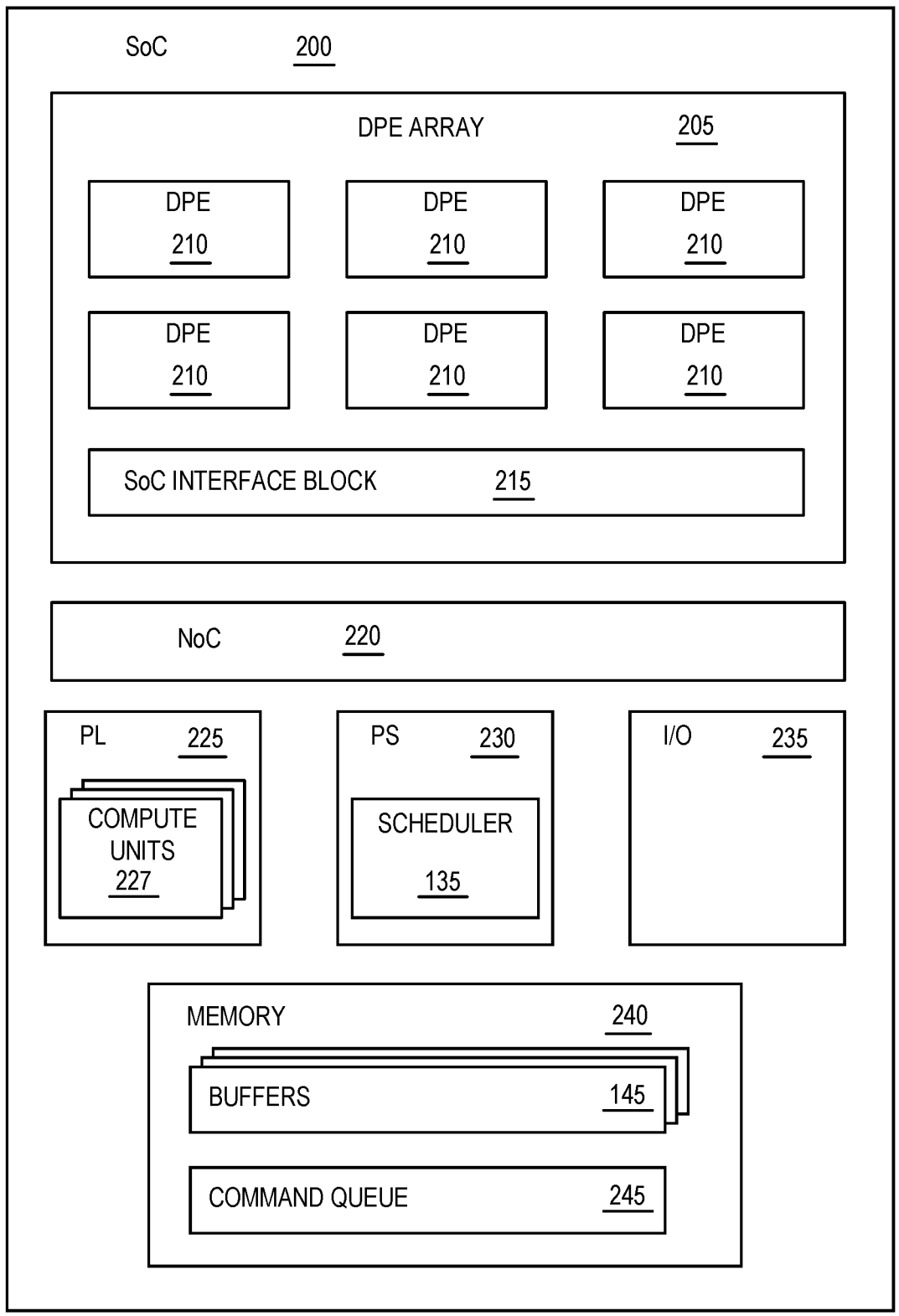
FIG. 2 is a block diagram of a SoC that includes a data processing engine array, according to an example.

FIG. 2 is a block diagram of a SoC 200 (e.g., one example of a heterogeneous system 130 in FIG. 1) that includes a data processing engine (DPE) array 205, according to an example. The DPE array 205 includes a plurality of DPEs 210 which may be arranged in a grid, cluster, or checkerboard pattern in the SoC 200. Although FIG. 2 illustrates arranging the DPEs 210 in a 2D array with rows and columns, the embodiments are not limited to this arrangement. Further, the array 205 can be any size and have any number of rows and columns formed by the DPEs 210.

In one embodiment, the DPEs 210 are identical. That is, each of the DPEs 210 (also referred to as tiles or blocks) may have the same hardware components or circuitry. Further, the embodiments herein are not limited to DPEs 210. Instead, the SoC 200 can include an array of any kind of processing elements, for example, the DPEs 210 could be digital signal processing engines, cryptographic engines, Forward Error Correction (FEC) engines, or other specialized hardware for performing one or more specialized tasks.

In FIG. 2, the array 205 includes DPEs 210 that are all the same type (e.g., a homogeneous array). However, in another embodiment, the array 205 may include different types of engines. For example, the array 205 may include digital signal processing engines, cryptographic engines, graphic processing engines, and the like. Regardless if the array 205 is homogenous or heterogeneous, the DPEs 210 can include direct connections between DPEs 210 which permit the DPEs 210 to transfer data directly.

In one embodiment, the DPEs 210 are formed from software-configurable hardened logic—i.e., are hardened. One advantage of doing so is that the DPEs 210 may take up less space in the SoC 200 relative to using programmable logic to form the hardware elements in the DPEs 210. That is, using hardened logic circuitry to form the hardware elements in the DPE 210 such as program memories, an instruction fetch/decode unit, fixed-point vector units, floating-point vector units, arithmetic logic units (ALUs), multiply accumulators (MAC), and the like can significantly reduce the footprint of the array 205 in the SoC 200. Although the DPEs 210 may be hardened, this does not mean the DPEs 210 are not programmable. That is, the DPEs 210 can be configured when the SoC 200 is powered on or rebooted to perform different functions or tasks.

The DPE array 205 also includes a SoC interface block 215 (also referred to as a shim) that serves as a communication interface between the DPEs 210 and other hardware components in the SoC 200. In this example, the SoC 200 includes a network on chip (NoC) 220 that is communicatively coupled to the SoC interface block 215. Although not shown, the NoC 220 may extend throughout the SoC 200 to permit the various components in the SoC 200 to communicate with each other. For example, in one physical implementation, the DPE array 205 may be disposed in an upper right portion of the integrated circuit forming the SoC 200. However, using the NoC 220, the array 205 can nonetheless communicate with, for example, programmable logic (PL) 225, a processor subsystem (PS) 230 or input/output (I/O) 235 which may disposed at different locations throughout the SoC 200.

In addition to providing an interface between the DPEs 210 and the NoC 220, the SoC interface block 215 may also provide a connection directly to a communication fabric in the PL 225. In this example, the PL 225, the DPEs 210, and the PS 230 can form a collection of heterogeneous processing units (e.g., the heterogeneous processing units 140 in FIG. 1) since some of the stages in a pipeline may be assigned to the DPEs 210 for execution while others are assigned to the PL 225 and the PS 230. While FIG. 2 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

In one embodiment, the SoC interface block 215 includes separate hardware components for communicatively coupling the DPEs 210 to the NoC 220 and to the PL 225 that is disposed near the array 205 in the SoC 200. In one embodiment, the SoC interface block 215 can stream data directly to a fabric for the PL 225. For example, the PL 225 may include an FPGA fabric which the SoC interface block 215 can stream data into, and receive data from, without using the NoC 220. That is, the circuit switching and packet switching described herein can be used to communicatively couple the DPEs 210 to the SoC interface block 215 and also to the other hardware blocks in the SoC 200. In another example, the SoC interface block 215 may be implemented in a different die than the DPEs 210. In yet another example, DPE array 205 and at least one subsystem may be implemented in a same die while other subsystems and/or other DPE arrays are implemented in other dies. Moreover, the streaming interconnect and routing described herein with respect to the DPEs 210 in the DPE array 205 can also apply to data routed through the SoC interface block 215.

The PL 225 includes compute units 227 which may be user-defined processor units formed using the PL 225. In one embodiment, each compute unit 227 can be a stage in a pipeline (e.g., stages in the same pipeline or stages in different pipelines executing in the SoC 200).

The PS 230 includes the scheduler 135. In one embodiment, the PS 230 is a general-purpose processor (e.g., a CPU) that uses an ISA to execute the scheduler 135. For example, the PS 230 may be a general-purpose processor like the processors in the host (not shown), although the PS 230 may not be as powerful. In any case, the scheduler 135 can be firmware or software that executes on the PS 230 to launch and control the execution of a pipeline forms using the various processing units in the SoC 200 (e.g., the DPEs 210, compute units 227, and PS 230).

The SoC 200 also includes a memory 240 which can be volatile and non-volatile memory. Further, while the memory 240 is shown within the SoC 200, in other embodiments, the memory 240 may be disposed on a separate IC from the SoC 200. In this embodiment, the memory 240 includes the buffers 150 which can be disposed between the stages in the pipeline and a command queue 245. As described later, the command queue 245 stores commands from the host (and more specifically, from the user application) to control the execution of the pipeline.

Although FIG. 2 illustrates one block of PL 225, the SoC 200 may include multiple blocks of PL 225 (also referred to as configuration logic blocks) that can be disposed at different locations in the SoC 200. For example, the SoC 200 may include hardware elements that form a field programmable gate array (FPGA). However, in other embodiments, the SoC 200 may not include any PL 225—e.g., the SoC 200 is an ASIC.

Figure 3:
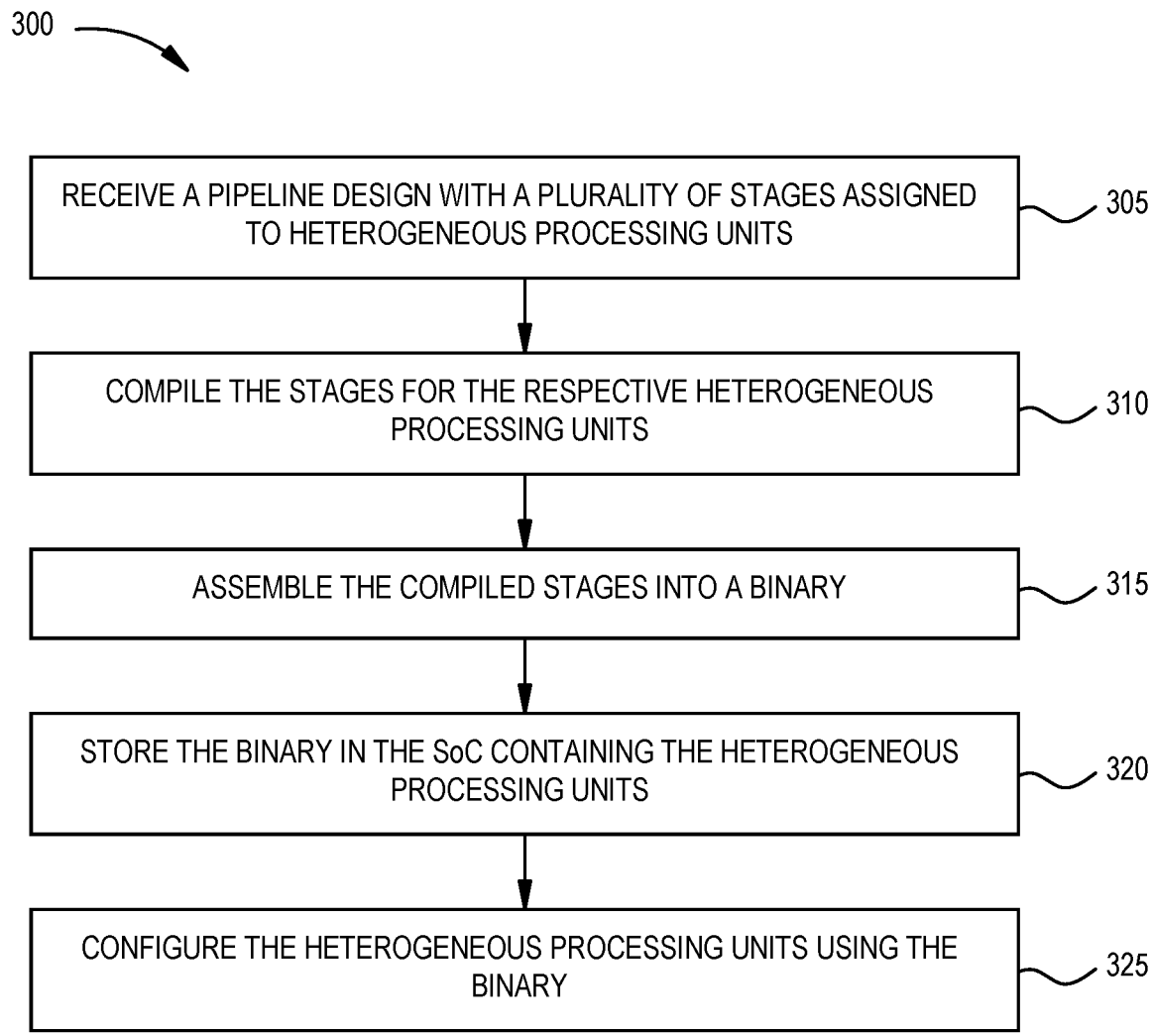
FIG. 3 is a flowchart for launching a pipeline formed by heterogeneous processing units, according to an example.

FIG. 3 is a flowchart of a method 300 for launching a pipeline formed by heterogeneous processing units, according to an example. At block 305, the user application receives a pipeline design with a plurality of stages assigned to heterogeneous processing units. The pipeline design may be designed by a programmer or could be automatically designed by a software application. In any case, the pipeline design defines the flow of the pipeline and which stages in the pipeline should be assigned to which processing unit. In one embodiment, at least one of the stages may be performed by a processing unit in the host (e.g., a CPU) while at least one other stage is performed by a processing unit in the SoC (e.g., a peripheral device). In another embodiment, multiple stages in the pipeline are assigned to different processing units in the SoC, while none of the stages are performed by the host. In both cases, the pipeline has stages executed by heterogeneous processing units.

At block 310, the host compiles the stages for the respective heterogeneous processing units. In one embodiment, the host may use a different compiler for each type of processing unit. For example, to compile software code corresponding to a first stage to execute on a CPU in the host, the host may use a first compiler. To compile register transfer language (RTL) code corresponding to a second stage to execute on the PL in the SoC, the host may use a second compiler. To compile software code corresponding to a third stage to execute on the PS in the SoC, the host may use a third compiler. These compiler may be located on the same compute system, or may be on different compute systems.

At block 315, the host assembles the compiled stages into a binary. In one embodiment, the binary includes the necessary data for configuring the processing units in the SoC to execute the stages in the pipeline. That is, the binary may include multiple portions, where each portion contains configuration information for a respective one of the processing units in the SoC. If the pipeline includes stages executed on the CPUs in the host, the compiled code may be stored in memory in the host rather than being assembled into the binary.

At block 320, the SoC stores the binary received from the host. The binary can be stored in local memory in the SoC or in attached memory. Moreover, when transmitting the binary to the SoC, the host may inform the scheduler on the host that the binary has been sent to the SoC. This may wake up the scheduler so it can launch the pipeline. In one embodiment, the host transmits the binary to the SoC using a direct memory access (DMA) transaction. The host can also use a special command (e.g., an opcode) to wake up the scheduler and inform the scheduler where the binary is stored in memory in the SoC.

At block 325, the scheduler in the SoC configures the heterogeneous processing units using the binary. For example, the scheduler may form any compute units (if they have not been formed already) in the PL, or establish soft kernels in the PS. In one embodiment, the scheduler evaluates the binary and identifies the portion of the binary corresponding to each of the processing units. For example, the binary may include shared objects suitable for the PS, bitstreams used to program the PL fabric, and if applicable, configuration data for other processing units such as the DPEs. Using this configuration information, the scheduler configures the processing units to perform the various stages of the pipeline. After doing so, the pipeline is ready to perform tasks (e.g., accelerator tasks) received from the user application executing on the host.

Figure 4:
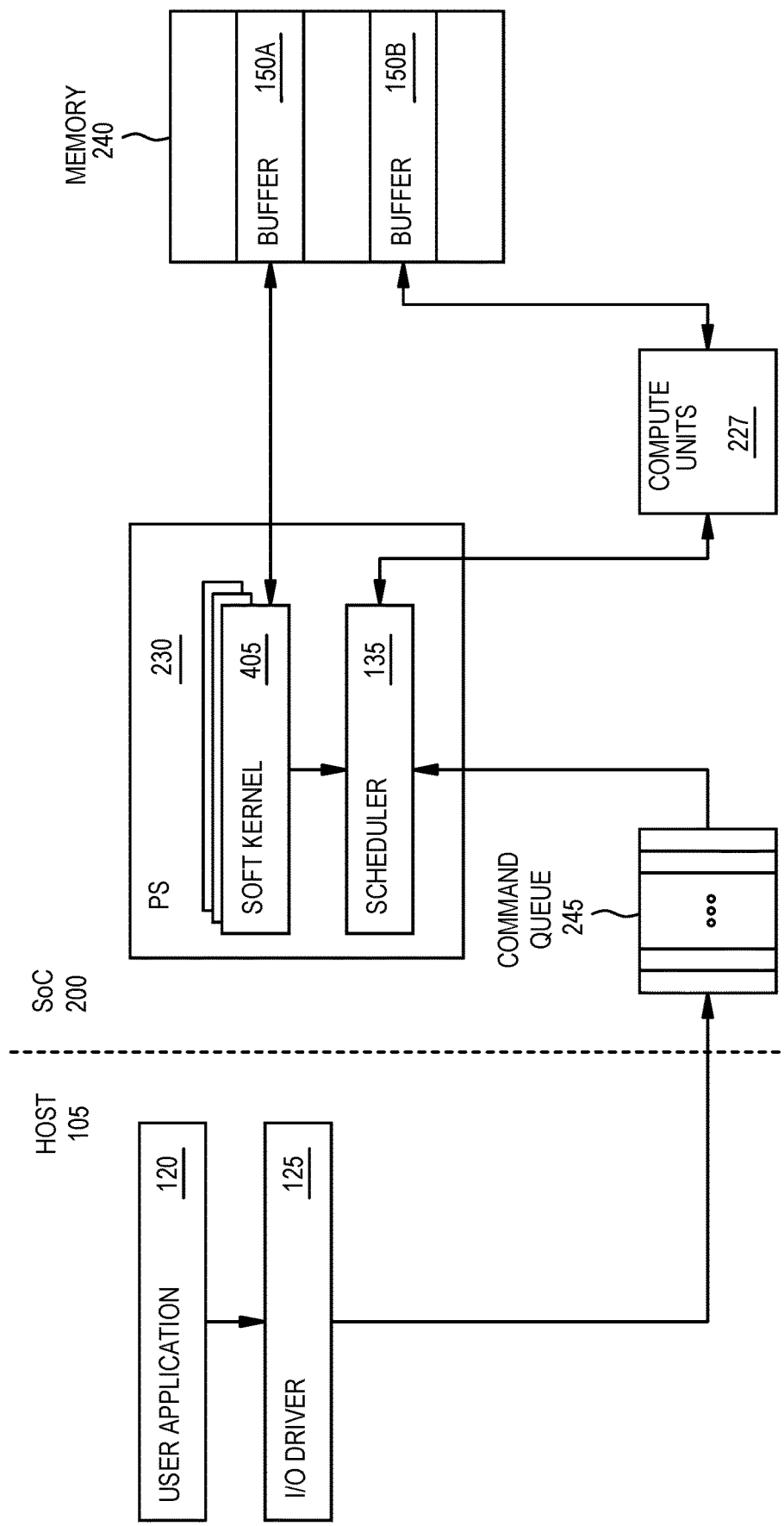
FIG. 4 is a hardware description of a pipeline formed by heterogeneous processing units, according to an example.

FIG. 4 is a hardware description of a pipeline formed by heterogeneous processing units, according to an example. That is, FIG. 4 illustrates hardware and software that can be used to implement a pipeline that executes on heterogeneous processing units. The hardware and software elements are divided by the vertical line where the user application 120 and the I/O driver 125 are in the host 105 while everything to the right of the vertical line is in the SoC 200.

The user application 120 submits tasks to the I/O driver 125 which serves as an interface between the host 105 and the hardware and software elements in the SoC 200. The I/O driver 125 can convert the tasks into commands that are then transmitted and stored in the command queue 245. The various procedures for executing these commands are described in the flowcharts below.

The command queue 245 is communicatively coupled to the scheduler 135 executing in the PS 230. The scheduler 135 can retrieve and execute the commands on the processing units in the SoC 200. In this example, the PS 230 includes soft kernels 405 and compute units 227 (which may be implemented using PL) which can execute the commands. In one embodiment, the soft kernels 405 are software functions in one or more shared libraries. The scheduler 135 can pass arguments into the functions defined by the soft kernels 405, the functions process data using the arguments, and then store the process data in one of the buffers 150 in the memory 240. In one embodiment, the scheduler 135 generates an activation record (a small—e.g., 4 kB—chunk of memory in the PS 230) that stores the input arguments for the soft kernels 405. The scheduler 135 can store pointers in the activation record which point to the data which the soft kernels 405 should process when executing a stage of the pipeline.

In one embodiment, the soft kernels 405 can execute in a container in the PS 230 that restricts what the kernels 405 can access in the SoC 200. For example, the host 105 and SoC 200 may be part of a cloud computing service that a customer uses to execute its application 120. Because the soft kernels 405 can be user-defined functions (rather than something the system administrator generated and vetted), the administrator may require these kernels 405 to be executed in the containers so that the kernels 405 cannot, for example, access or corrupt memory in the SoC 200 not assigned to it.

In addition to submitting commands to the soft kernel 405, the scheduler 135 is also communicatively coupled to the compute units 227. For example, while not shown, the scheduler 135 may use a NoC in the SoC 200 to communicate with the compute units 227 or DPEs. Further, the compute units 227 and the soft kernels 405 are assigned to buffers 150. These buffers can be input and output buffers so that the compute units 227 and the soft kernels 405 can retrieve data, process that data, and then store the data in the memory 240 so that downstream stages in the pipeline can access the data.

Figure 5:
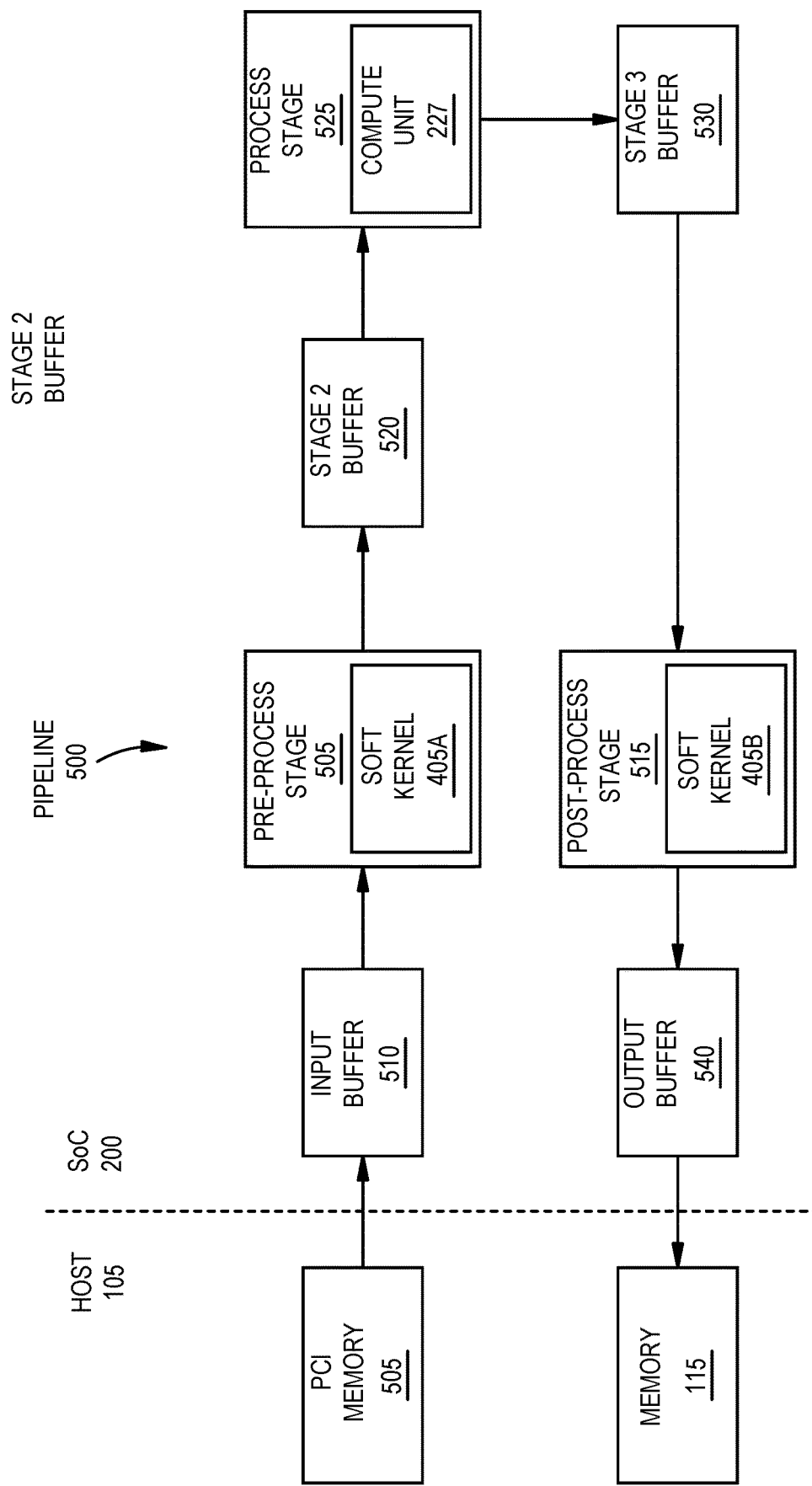
FIG. 5 is a block diagram of a pipeline formed using the hardware illustrated in FIG. 4, according to an example.

FIG. 5 is a block diagram of a pipeline 500 formed using the hardware illustrated in FIG. 4, according to an example. FIG. 5 includes a vertical dotted line where everything to the left of the line is in the host 105 while everything to the right of the line is in the SoC 200.

The pipeline 500 begins with a PCI memory 505 which may be used if the host 105 is communicatively coupled to the SoC 200 using a PCI connection (e.g., PCIe). In one embodiment, the PCI memory 505 is disposed on the PCI bus coupling the host 105 and the SoC 200. Instead of transmitting data destined to the SoC 200 to the main memory 115 in the host 105, this data can instead for stored in the PCI memory 505 (e.g., a non-volatile memory) that can directly send the data to the SoC 200.

The data is stored in an input buffer 510 which can be one of the buffers 150 in the memory 240. This data is then retrieved and processed by a pre-processing stage 515. In this embodiment, the stage 515 is performed by one of the soft kernels 405A. For example, the data provided by the host 105 may be in a format that is not compatible with later hardware elements in the pipeline 500. For example, the data may be formatted in JavaScript Object Notation (JSON) which is not compatible with the PL that host the compute units 227. As such, a programmer can define a soft kernel 405A, which is hosted by the PS 230, to perform preprocessing on the data to convert it into a format that is compatible with later stages.

The data processed by the stage 515 is then stored in a stage 2 buffer 520, which again, can be one of the buffers 150 in the memory 240 of the SoC 200. Once ready, a process stage 525 retrieves the data in the buffer 520 that is then processed by the compute unit 227. In one embodiment, the compute unit 227 may perform an accelerator task on the data such as a machine learning task, compression task, cryptography task, and the like. The process stage 525 stores the process data in a stage 3 buffer 530 (e.g., one of the buffers 150).

A post process stage 535 can retrieve the data from the buffer 530 and use another soft kernel 405B to perform post-processing on the data. That is, the compute unit 227 and the soft kernel 405B can share the stage 3 buffer 530 despite being different processing elements and possibly having different views/addresses of the buffer 530. Continuing the example above, the soft kernel 405B may convert the data output by the process stage 525 back into the format used by the data that was received by the host 105 (e.g., JSON). This data is then stored in an output buffer 540 that is another one of the buffers 150. Finally, the data is stored in the memory 115 in the host 105 where it can be retrieved and further processed by the software and hardware elements in the host 105, such as the user application and CPUs.

While the pipeline 500 includes only stages in the SoC 200, in other embodiments, one or more stages of the pipeline can be executed by processing units in the host 105 (e.g., CPUs). Further, while the pipeline 500 transfers data from the soft kernel 405 (e.g., a processor) to the compute unit 227 (e.g., PL), to the soft kernel 405B (e.g., the processor), other topologies are viable such as a first compute unit in PL to a soft kernel back to a second compute unit in PL, or a first soft kernel to a first compute unit in PL to second soft kernel back to second compute unit in PL, or a first compute unit in PL to a second compute unit in the PL to a soft kernel back to a third compute unit in the PL, etc.

Figure 6:
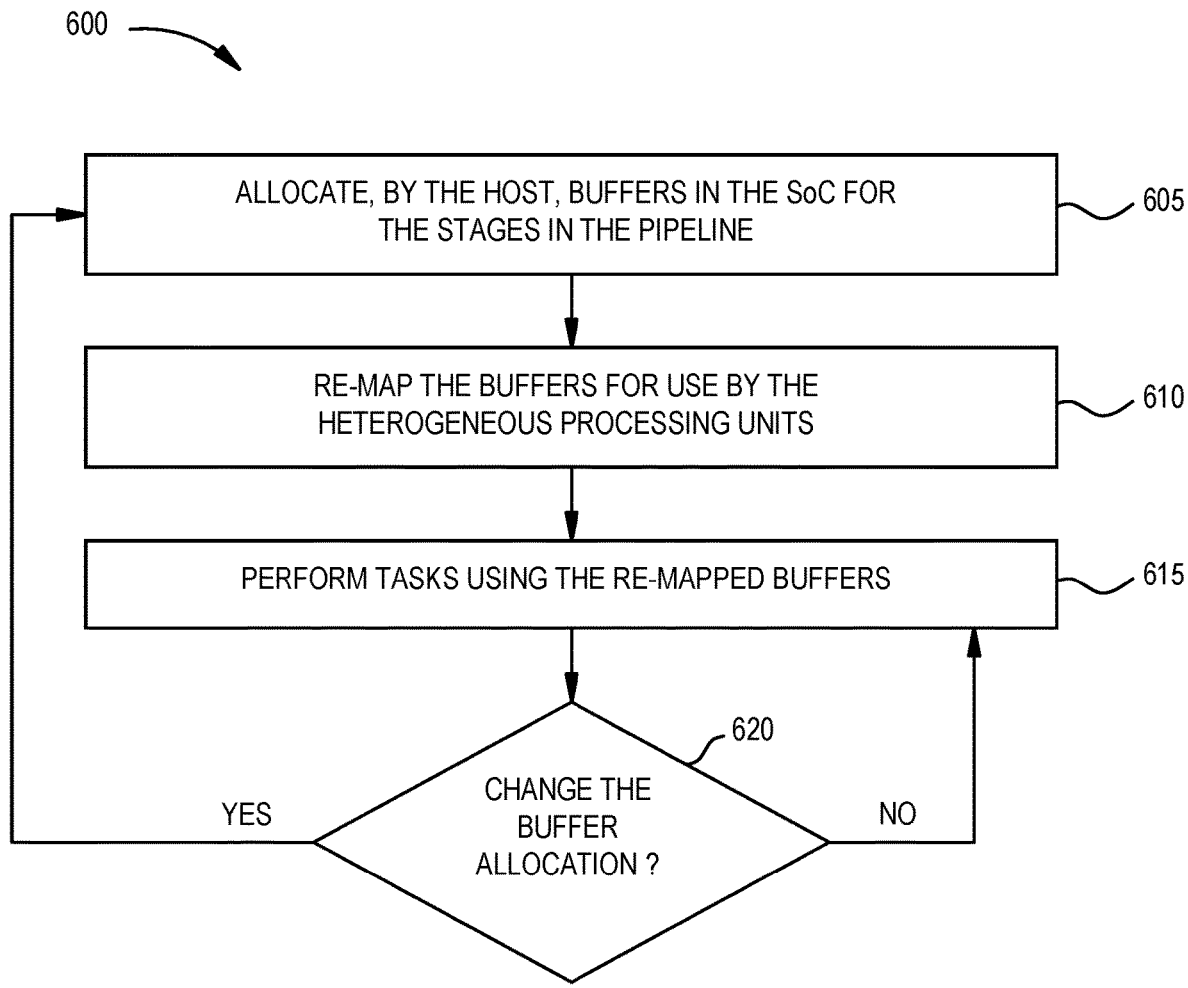
FIG. 6 is a flowchart for allocating buffers for a pipeline formed by heterogeneous processing units, according to an example.

FIG. 6 is a flowchart of a method 600 for allocating buffers for a pipeline formed by heterogeneous processing units, according to an example. Because the pipeline includes heterogeneous processing units which use different memory topologies and architectures, the method 600 can establish memory elements using software executing in the host, but these memory elements end up being assigned to processing units executing in the SoC.

At block 605, the I/O driver in the host allocates buffers in the SoC for the stages in the pipeline. The number and size of these buffers can be provided by the user application (or defined in the pipeline design). While in this embodiment the host allocates the buffers, some of these buffers need to be accessible by processing units in the SoC which use different memory topologies and architectures. For example, a memory buffer originally allocated by an x86 processor may not be visible to a compute engine executing in PL, or a soft kernel in the PS.

At block 610, the scheduler re-maps the buffers for use by the heterogeneous processing units. In one embodiment, the scheduler re-maps the address space of the buffers into PS address space so that the soft kernels in the PS can access the buffers. In another example, if the buffer is for a DPE, the scheduler can use the SoC interface block (i.e., the shim) to move the data in its assigned buffer so the DPE can absorb it. If the buffer is for a compute unit in the PL, the scheduler re-maps the physical address of the buffer to a physical address corresponding to the PL.

At block 615, the processing units can perform tasks (e.g., execute various stages of the pipeline) using the re-mapped buffers. The specific scheduling and execution of the stages are discussed below in FIGS. 8 and 9.

At block 620, the user application determines whether to change the current buffer allocation. For example, the pipeline may have been originally intended to handle data at a first rate, but if that rate has increased, the user application may instruct the I/O driver to increase the size of the buffers, or add additional stages and more buffers to the pipeline. If so, the method 600 can repeat by returning to block 605. Otherwise, the processing units can continue to perform their tasks using the current allocated buffers.

Figure 7:
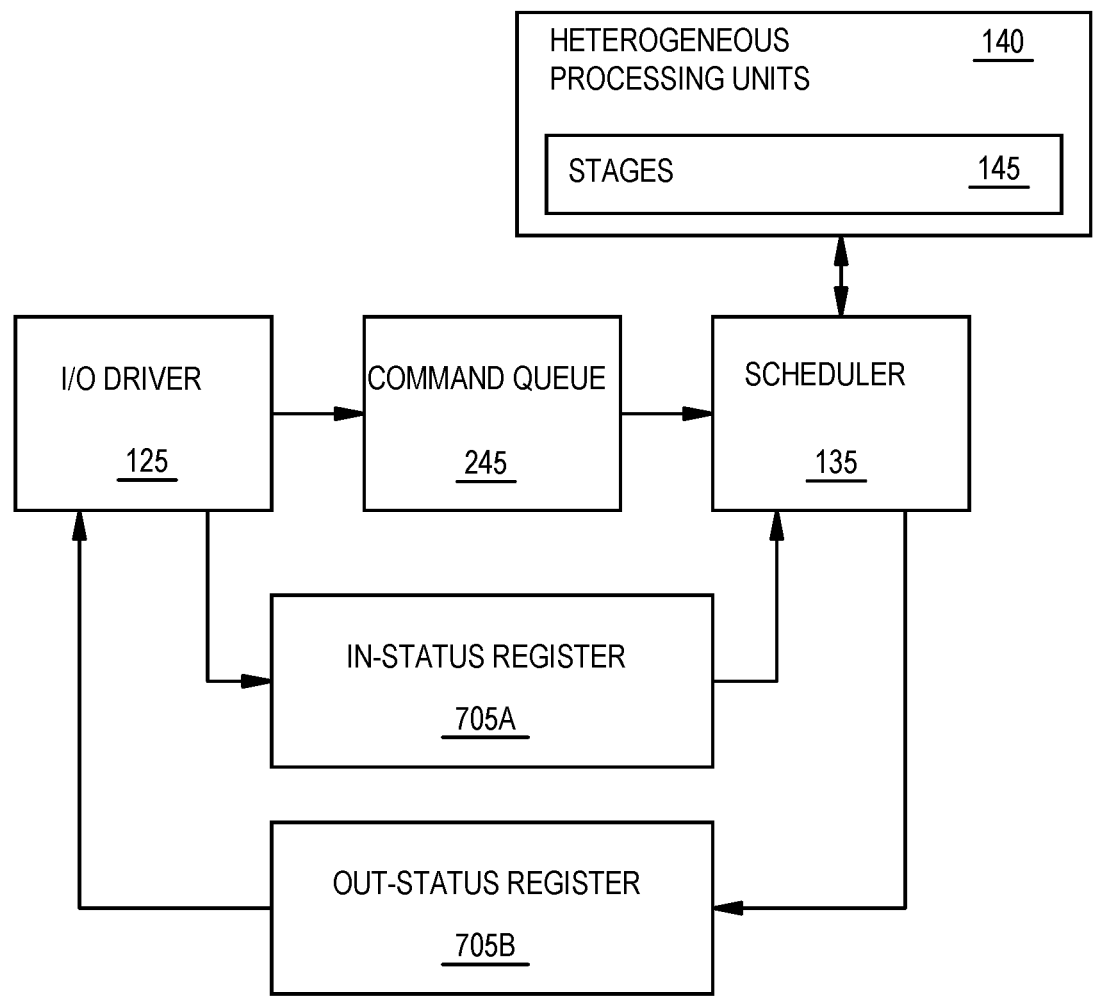
FIG. 7 illustrates communicating between a host and a SoC for executing a pipeline formed by heterogeneous processing units, according to an example.

FIG. 7 illustrates communicating between a host and a SoC for executing a pipeline formed by heterogeneous processing units, according to an example. FIG. 7 illustrates the hardware and software components that can be used to schedule and execute the stages in the pipeline. As shown, the I/O driver 125 is communicatively coupled to the command queue 245, an in-status register 705A, and an out-status register 705B. The status registers 705A and 705B are located in the SoC. As shown, the I/O driver 125 can at least write data into the in-status register 705A and at least read data from the out-status register 705B. When transmitting a command to the command queue 245, the I/O driver 125 also updates one or more bits in the in-status register 705A which informs (or wakes up) the scheduler 135 that a new command has been added to the command queue 245.

The scheduler 135 can retrieve the command from the command queue 245 and execute it using one of the heterogeneous processing units 140. That is, the command may correspond to one of the stages 145. The scheduler 135 can identify the processing unit 140 assigned to that stage 145 and instruct the processing unit 140 to perform the command.

Once the task or tasks corresponding to the command are complete, the scheduler 135 updates a bit in the out-status register 705B which is being monitored by the I/O driver 125. The I/O driver 125 can inform the user application that the command is complete.

Figure 8:
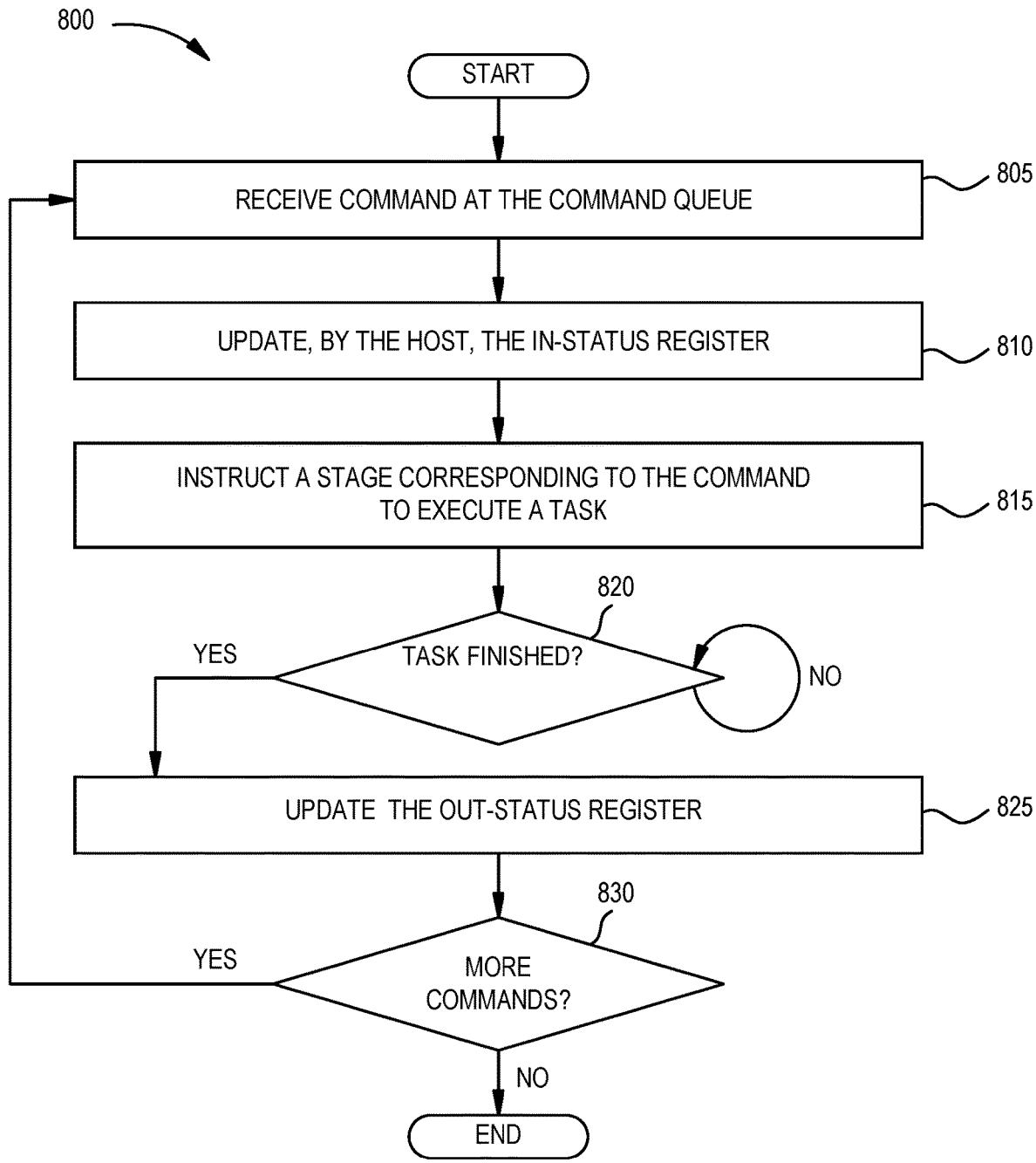
FIG. 8 is a flowchart for executing a pipeline formed by heterogeneous processing units, according to an example.

FIG. 8 is a flowchart of a method 800 for executing a pipeline formed by heterogeneous processing units, according to an example. At block 805, the SoC receives a command at the command queue. In one embodiment, the command indicates a task or tasks that is performed at a single stage in the pipeline. For example, if the pipeline has three stages, the host issues three commands to move data through the entire pipeline.

At block 810, the host (e.g., the I/O driver) updates the in-status register (e.g., the in-status register 705A in FIG. 7) to indicate to the scheduler that a new command is ready to be performed by the pipeline. For example, the scheduler may continuously monitor the in-status register to determine when a new command is received. If all commands have been completed, the scheduler may sleep while waiting for a new command.

At block 815, the scheduler wakes up when the status register was updated and instructs a stage corresponding to the command to execute a task. Using FIG. 5 as an example, the command may correspond to a task (or tasks) performed at one of the stages 515, 525, or 535. The scheduler can then instruct the processing unit assigned to the stage to perform the task.

At block 820, the scheduler waits until the task is finished. For example, the scheduler may sleep until the processing unit assigned the task sends a wake-up signal to the scheduler, informing it the task is complete.

Once finished, at block 825, the scheduler updates the out-status register (e.g., the out-status register 705B in FIG. 7) to inform the host that the command was complete. The data resulting from performing the command may be stored in a buffer that is between stages, or at the output buffer of the pipeline if the command was for the last stage. In the case where the command was for the last stage, the I/O driver may retrieve the data from the output buffer in the pipeline and store the data locally in the host. The user application can then further process the data as desired.

The scheduler also waits (or sleeps) until another command is transmitted by the host. In the method 800, the host may wait until a command is complete before issuing another command. For example, the host may first issue a command to perform stage 1. Once the scheduler informs the host that this command is complete, the host sends a command to perform stage 2 (and the method 800 repeats). Once the scheduler informs the host that this command is complete, the host sends a command to perform stage 3 (and the method 800 repeats), and so forth. In this manner, the host can use the scheduler to control the execution of the stages in the heterogeneous processing units.

Figure 9:
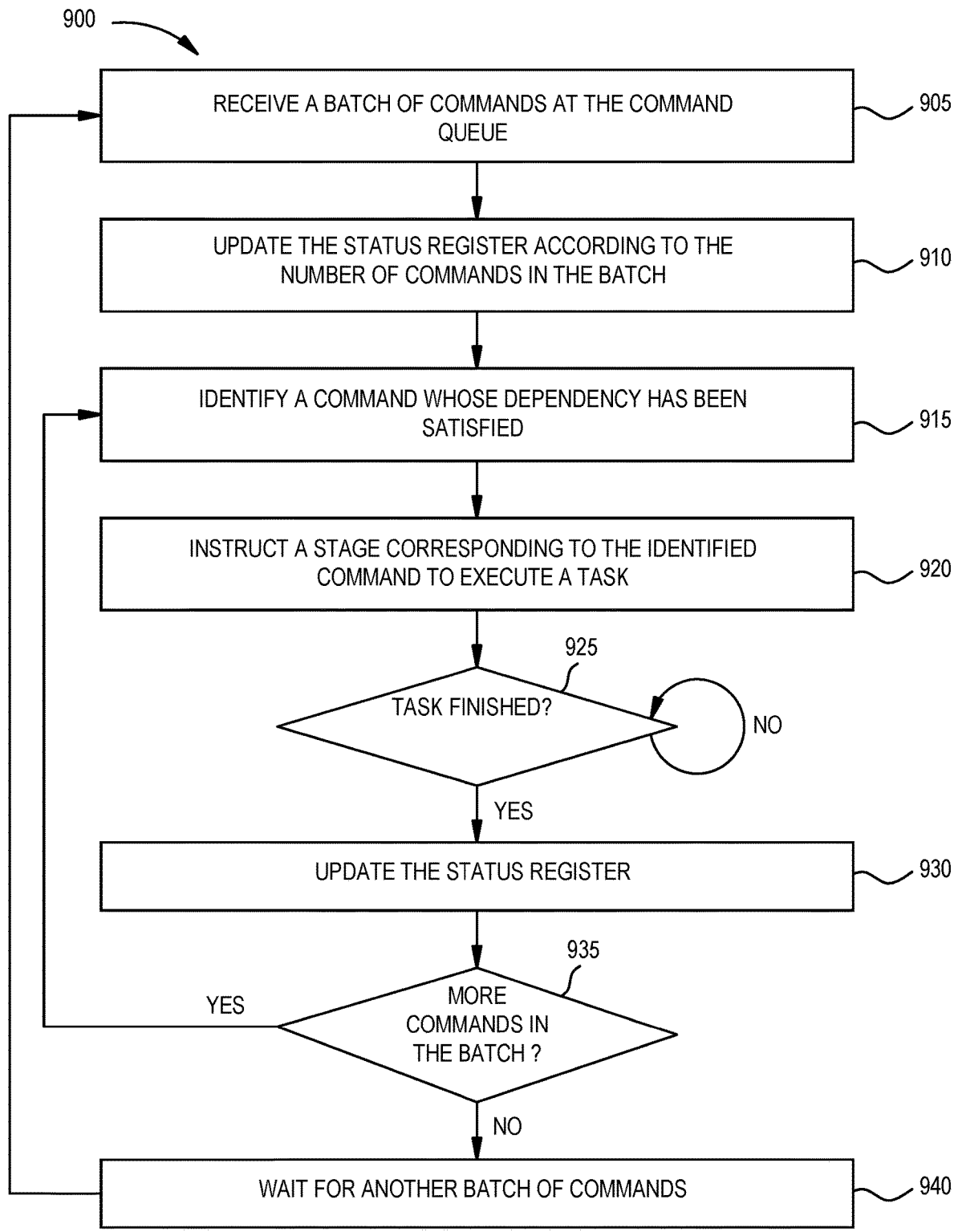
FIG. 9 is a flowchart for executing a pipeline formed by heterogeneous processing units, according to an example.

FIG. 9 is a flowchart of a method 900 for executing a pipeline formed by heterogeneous processing units, according to an example. The method 900 differs from the method 800 in that the host sends a batch of commands for executing a plurality of stages at a time. That is, rather than sending a single command at a time (and waiting for the corresponding stage to complete), the host sends a batch of commands for performing multiple stages in the pipeline—e.g., a first command for performing the first stage, a second command for performing the second stage, a third command for the third stage, and so forth. However, unlike in the method 800, the commands using in method 900 may have dependencies that dictate an order in which the commands are executed by the scheduler. For example, before performing the second command (corresponding to the second stage), the host may instruct that the first command must be complete. The second command may include dependency data that indicates other commands that must be complete before the schedule can execute the second command. The third command may include dependency data indicating that the second command must be complete.

At block 905, the SoC receives a batch of commands at the command queue. These commands may correspond to different stages and have different dependency data embedded therein. For example, the batch may include a first command with no dependency data for performing the first stage, a second command for performing the second stage (and dependency data indicating the scheduler should wait for the first command to finish), and a third command for performing the third stage (and dependency data indicating the scheduler should wait for the second command to finish). This batch of commands may be used to move the data currently stored in the input buffer through the first three stages of the pipeline.

At block 910, the host updates the status register according to the number of commands in the batch. If the batch includes three commands, the host may update three bits in the status register so the scheduler knows there are three commands in the command queue.

At block 915, the scheduler identifies a command whose dependency has been satisfied. Using the previous example, because the first command does not have a data dependency, the scheduler is able to execute that command. The other two commands in the batch have dependencies that have not yet been satisfied.

At block 920, the scheduler instructs a stage corresponding to the identified command to execute a task. Continuing the example, the scheduler instructs the processing unit assigned the first stage to execute the task corresponding to the first command.

In one embodiment, after issuing the first command, the scheduler may check the command queue to see if other commands (whose data dependencies have also been satisfied) can be executed in parallel. In one embodiment, the host provides multiple batches at a time to the SoC where each batch moves a chunk of data through the pipeline. For example, if there are three stages in the pipeline, the host may provide a first batch of three commands to process a first chunk of data using the pipeline, a second batch of three commands to process a second chunk of data using the pipeline, a third batch of three commands to process a third chunk of data using the pipeline, and so forth. Assuming the first stage has already processed the first chunk of data, while the second stage is processing the first chunk of data, the scheduler can instruct the first stage to process the second chunk of data. Similarly, while the third stage processes the first chunk of data, the second stage can process the second chunk of data, and the first stage can process the third chunk of data. In this manner, so long as the data dependencies are met, multiple stages in the pipeline can execute in parallel.

At block 925, the scheduler waits until the task is finished. As mentioned above, multiple stages may currently be executing, in which case, the scheduler may wait until all the stages have completed.

Once complete, at block 930, the scheduler updates the status register monitored by the host so the host knows the command was complete. In one embodiment, command metadata is also updated to indicate completion so that the scheduler can identify a new command that is now ready to execute. Rather than having to wait for the host to issue another command, at block 935, the scheduler can determine whether there are more commands in the batch ready to be performed, and if so, the method returns to block 915 where the scheduler identifies a command whose data dependency is satisfied. For example, if the pipeline just completed the first command using the first stage, the scheduler can now execute the second command on the second stage. In this manner, blocks 915-935 can repeat until all the commands in the batch are complete.

In one embodiment, the dependencies between commands are recorded as a graph, such that upon command completion, only children of the completed command are checked in. In addition to each node in the graph having a list of its dependents, but the nodes can also have a dependency count of how many commands it depends on. The count improves the efficiency of the check performed at block 915 since count is a 0 for the command to be ready to be executed. The count is decremented as part of performing block 930 by visiting all the children of the task (command) that just finished and decrement their dependency count. If a command dependency becomes 0, it can be immediately executed at block 920. In another embodiment, all pending commands could be check as soon as one command (task) finishes, but this may be less efficient since many commands would have to be checked rather than simply evaluating the counts associates with the commands.

Moreover, the host may have sent multiple batches, or sent another batch before the scheduler has finished executing the previous batch. In this situation, the blocks 915-935 can repeat until the commands are all complete. Further, as described above, the scheduler may be able to execute commands in different batches in parallel.

Once all the commands are complete, at block 940, the scheduler may wait to receive another batch of commands. For example, the scheduler may sleep or idle while waiting for additional commands. Once more commands are received, the method 900 can repeat at block 905.

Figure 10:
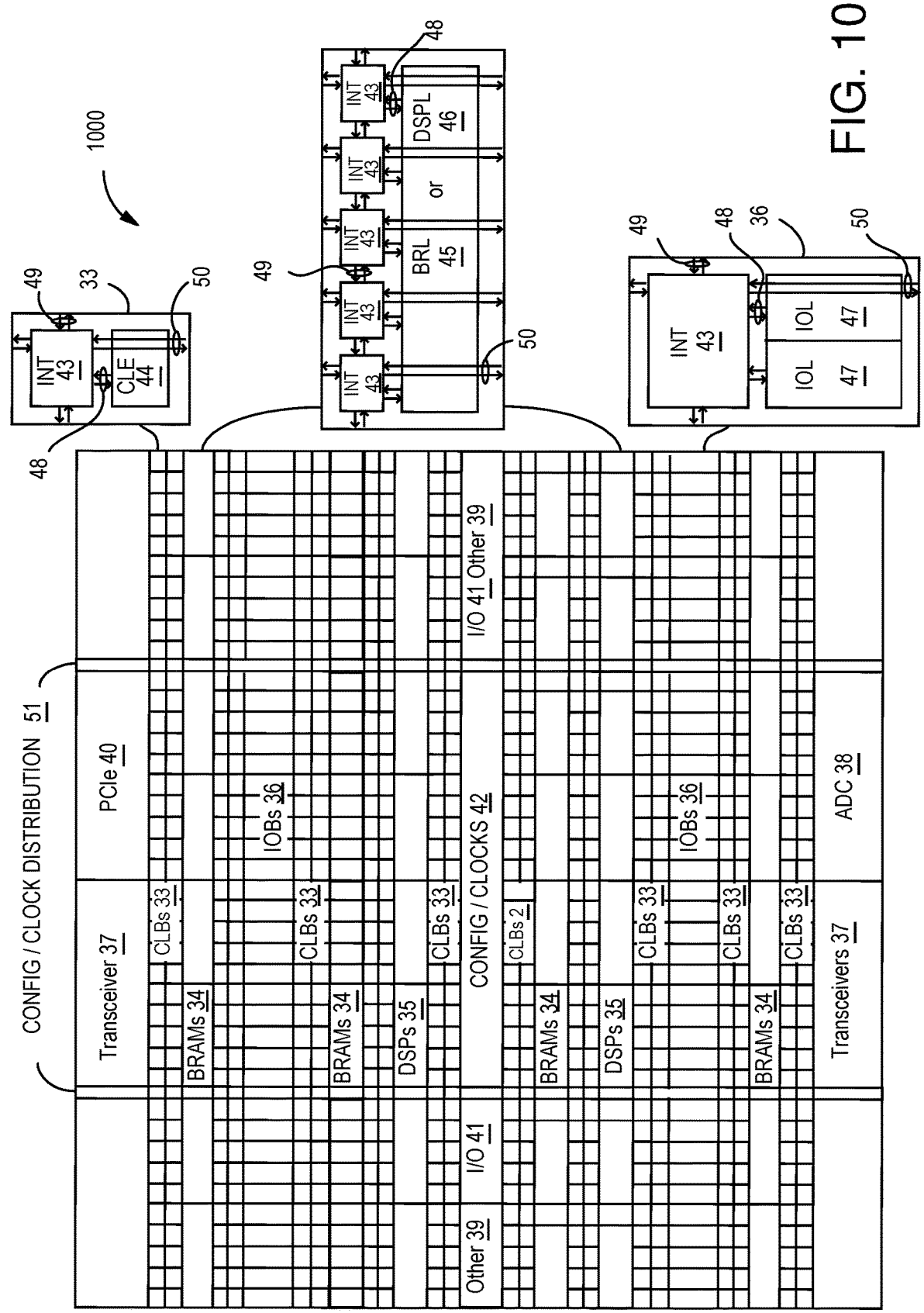
FIG. 10 illustrates a field programmable gate array implementation of a programmable IC according to an example.

FIG. 10 illustrates an FPGA 1000 implementation of the PL in the SoC 200 in FIG. 2, and more specifically with a FPGA with a PL array that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("IO") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 10. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual IO pads connected, for example, to the IO logic element 47 typically are not confined to the area of the input/output logic element 47.

In the pictured example, a horizontal area near the center of the die (shown in FIG. 10) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A heterogeneous system, comprising:
a plurality of heterogeneous processing units, wherein the heterogeneous processing units are assigned to execute a plurality of stages forming a pipeline;
a command queue configured to receive commands issued by a host;
a first status register writable by a scheduler and readable by the host; and
the scheduler configured to:
instruct a first stage of the plurality of stages to execute a first task corresponding to a first command,
inform the host when the first command is complete by updating bits in the first status register,
instruct a second stage of the plurality of stages to execute a second task corresponding to a second command, and
inform the host when the second command is complete by updating bits in the first status register.

2. The heterogeneous system of claim 1, wherein the plurality of heterogeneous processing units comprises a processor executing a kernel assigned to the first stage and programmable logic executing a compute unit assigned to the second stage.

3. The heterogeneous system of claim 1, wherein the heterogeneous system is a system on a chip (SoC).

4. The heterogeneous system of claim 1, further comprising:
a second status register writable by the host and readable by the scheduler, wherein the scheduler is configured to:
monitor the second status register to determine when the host has transmitted the first and second commands to the heterogeneous system.

5. The heterogeneous system of claim 1, wherein the second command comprises a data dependency indicating the scheduler can dispatch the second command only after the first command is completed, wherein instructing the second stage to execute the second task corresponding to the second command is performed after the scheduler determines the first task corresponding to the first command is complete.

6. The heterogeneous system of claim 1, further comprising:
memory comprising a plurality of buffers arranged in the pipeline between each of the plurality of stages, wherein the plurality of buffers are assigned to the heterogeneous processing units, wherein at least one of the plurality of buffers is shared by two of the heterogeneous processing units.

7. The heterogeneous system of claim 6, configured to:
receive an allocation of the plurality of buffers from the host; and
re-map the plurality of buffers from a format compatible with the host to respective formats compatible with the heterogeneous processing units.

8. The heterogeneous system of claim 1, configured to:
receive a binary from the host, the binary comprising multiple portions containing configuration data for configuring the heterogeneous processing units to perform the plurality of stages,
wherein the scheduler is configured to identify the multiple portions in the binary and configure the heterogeneous processing units using their respective portions.

9. A method, comprising:
receiving, from a host, multiple commands to perform at a plurality of stages forming a pipeline implemented in a heterogeneous system, wherein the heterogeneous system comprises a plurality of heterogeneous processing units assigned to execute the plurality of stages;
instructing, at the heterogeneous system, the plurality of stages to execute tasks corresponding to the multiple commands;
informing the host each time one of the commands complete;
allocating, using the host, a plurality of buffers to the heterogeneous processing units, wherein the plurality of buffers are arranged in the pipeline between each of the plurality of stages; and
re-mapping the plurality of buffers from a format compatible with the host to respective formats compatible with the heterogeneous processing units.

10. The method of claim 9, wherein the plurality of heterogeneous processing units comprises a processor executing a kernel assigned to a first stage of the plurality of stages and programmable logic executing a compute unit assigned to a second stage of the plurality of stages.

11. The method of claim 9, wherein the heterogeneous system is a peripheral input/output (I/O) device.

12. The method of claim 9, wherein informing the host each time one of the commands completes comprises:
updating bits in a first status register in the heterogeneous system, the bits indicating the multiple commands are complete.

13. The method of claim 9, further comprising:
monitoring a second status register in the heterogeneous system to determine when the heterogeneous system has received the multiple commands from the host.

14. The method of claim 9, wherein a first command in the multiple commands comprises a data dependency indicating that the heterogeneous system can dispatch the first command only after a second command of the multiple commands is completed, wherein instructing the plurality of stages to execute tasks corresponding to the multiple commands comprises:

executing the second command; and executing the first command after determining the second command is complete.

15. The method of claim 9, further comprising:

receiving, at the host, a design of the pipeline;

compiling the plurality of stages for the heterogeneous processing units based on the design;

assembling the compiled stages into a binary;

storing the binary in the heterogeneous system; and configuring the heterogeneous processing units using the binary, the binary comprising multiple portions each corresponding to one of the heterogeneous processing units.

16. A heterogeneous system, comprising:

a plurality of heterogeneous processing units, wherein the heterogeneous processing units are assigned to execute a plurality of stages forming a pipeline;

a command queue configured to receive commands issued by a host; and a scheduler configured to:

instruct a first stage of the plurality of stages to execute a first task corresponding to a first command, inform the host when the first command is complete, instruct a second stage of the plurality of stages to execute a second task corresponding to a second command, wherein the second command comprises a data dependency indicating the scheduler can dispatch the second command only after the first command is completed, wherein instructing the second stage to execute the second task corresponding to the second command is performed after the scheduler determines the first task corresponding to the first command is complete, and inform the host when the second command is complete.

17. A heterogeneous system, comprising:

a plurality of heterogeneous processing units, wherein the heterogeneous processing units are assigned to execute a plurality of stages forming a pipeline;

a command queue configured to receive commands issued by a host;

memory comprising a plurality of buffers arranged in the pipeline between each of the plurality of stages, wherein the plurality of buffers are assigned to the heterogeneous processing units, wherein at least one of the plurality of buffers is shared by two of the heterogeneous processing units; and a scheduler configured to:

instruct a first stage of the plurality of stages to execute a first task corresponding to a first command, inform the host when the first command is complete, instruct a second stage of the plurality of stages to execute a second task corresponding to a second command, and inform the host when the second command is complete.

18. A heterogeneous system, comprising:

a plurality of heterogeneous processing units, wherein the heterogeneous processing units are assigned to execute a plurality of stages forming a pipeline;

a command queue configured to receive commands issued by a host; and a scheduler configured to:

instruct a first stage of the plurality of stages to execute a first task corresponding to a first command, inform the host when the first command is complete, instruct a second stage of the plurality of stages to execute a second task corresponding to a second command, and inform the host when the second command is complete, wherein the heterogeneous system is configured to receive a binary from the host, the binary comprising multiple portions containing configuration data for configuring the heterogeneous processing units to perform the plurality of stages, wherein the scheduler is configured to identify the multiple portions in the binary and configure the heterogeneous processing units using their respective portions.

* * * * *